Fig. 4.

No. 850,343. PATENTED APR. 16, 1907.
E. W. CHANNELL.
FENCE MACHINE.
APPLICATION FILED JAN. 8, 1906.

WITNESSES:

Emmett W. Channell INVENTOR

By

ATTORNEYS.

No. 850,343. PATENTED APR. 16, 1907.
E. W. CHANNELL.
FENCE MACHINE.
APPLICATION FILED JAN. 8, 1906.

WITNESSES: Emmett W. Channell INVENTOR
By C. A. Snow & Co
ATTORNEYS No. 850,343. PATENTED APR. 16, 1907.
E. W. CHANNELL.
FENCE MACHINE.
APPLICATION FILED JAN. 8, 1906.

WITNESSES:

Emmett W. Channell INVENTOR

By C. A. Snow & Co
ATTORNEYS

No. 850,343. PATENTED APR. 16, 1907.
E. W. CHANNELL.
FENCE MACHINE.
APPLICATION FILED JAN. 8, 1906.

WITNESSES:

Emmett W. Channell INVENTOR

By C. A. Snow & Co

ATTORNEYS

No. 850,343. PATENTED APR. 16, 1907.
E. W. CHANNELL.
FENCE MACHINE.
APPLICATION FILED JAN. 8, 1906.

WITNESSES:

Emmett W. Channell
INVENTOR

By
ATTORNEYS

No. 850,343.　　　　　　　　　　　　　　PATENTED APR. 16, 1907.
E. W. CHANNELL.
FENCE MACHINE.
APPLICATION FILED JAN. 8, 1906.

WITNESSES:　　　　　　　　　　Emmett W. Channell　INVENTOR
　　　　　　　　　　　　　　　　By C. A. Snow & Co
　　　　　　　　　　　　　　　　　　　ATTORNEYS

UNITED STATES PATENT OFFICE.

EMMETT WICKLIFF CHANNELL, OF LAKE CHARLES, LOUISIANA.

FENCE-MACHINE.

No. 850,343.  Specification of Letters Patent.  Patented April 16, 1907.

Application filed January 8, 1906. Serial No. 295,172.

*To all whom it may concern:*

Be it known that I, EMMETT WICKLIFF CHANNELL, a citizen of the United States, residing at Lake Charles, in the parish of Calcasieu and State of Louisiana, have invented a new and useful Fence-Machine, of which the following is a specification.

This invention relates to machines of that general class known as "fence-looms" and employed for the manufacture of picket or wire-and-slat fences wherein longitudinal strands of wire are twisted around or between spaced pickets.

The principal object of the invention is to provide a machine in which all of the operations, including the feeding of the pickets, the twisting of the wires, and the take-up, are entirely automatic and in which provision is made for accurate adjustment of all of the parts in order to insure uniformity of the product.

A further object of the invention is to provide an improved twisting mechanism through which a suitable length of wire to be twisted is fed and the twister-head advanced to a point close to the last picket introduced in order that the twisting operation may commence immediately below or to the rear of the picket, the twister-head gradually retreating as the twisting operation progresses, so that the twist will be uniform between adjacent pickets, and both the front and the rear edges of each picket will be firmly bound and held in place.

A still further object of the invention is to provide a novel means for clamping and holding the pickets and for insuring the retention of the wire in proper position around the pickets during the twisting operation.

A still further object of the invention is to provide a novel form of take-up mechanism or feed that operates on the successive pickets and accomplishes uniform feeding movement without regard to slight variations in the width of the pickets.

A still further object of the invention is to provide a novel form of twister-head which may be quickly adjusted or renewed when worn from constant use.

A still further object of the invention is to provide a novel form of take-up mechanism for rolling the finished fence and to so construct the same as to insure automatic adjustment of the mechanism as the diameter of the roll gradually increases.

A still further object of the invention is to provide a saw for trimming the ends of the pickets after the twisting operation and to so arrange and mount the saw as to enable it to accomplish its work with the least possible wear.

A still further object of the invention is to improve and simplify the picket-feeding mechanism and to so arrange the machine that large quantities of pickets may be dumped in feeding position and automatically carried in consecutive order to the twisting mechanism.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings.

Similar numerals of reference are employed to indicate corresponding parts throughout the several figures of the drawings.

The working parts of the machine are supported on a suitable framework, which for convenience may be divided into three sections 10, 11, and 12, the main or central section 10 carrying the loom mechanism proper, the section 11 the main portion of the power-transmitting devices and actuating-cam, and the portion 12 of the frame serving as a support for the picket-feeding devices.

The main shaft 15 of the machine carries fast and loose pulleys 16, having a belting connection with any suitable source of power, and from this shaft all portions of the mechanism are operated. This shaft carries near one end a pulley 17, that is connected by a belt 18 to a belt-wheel 19 on a horizontally-disposed shaft 20, having bearings in the lower portion of the section 11 of the frame. The shaft 20 carries a pinion 21, that is constantly in mesh with a large gear-wheel 22. This gear 22 is carried by the main cam-shaft 23 of the machine. From the main gear-wheel movement is imparted to the wire-twisting devices and picket-feeder, while the cam-shaft is provided with a number of cams that serve to actuate and to properly time the movement of the picket-clamps, feeding devices, take-ups, tying mechanism, and the like.

Extending across the front of the main portion of the frame are two pairs of angle-bars 30 and 31, that are provided with bearings for a series of vertically-disposed spool-carrying shafts 32, said shafts being provided with ball-bearings to permit easy running. To the lower end of each shaft is secured a miter-gear 34, the entire series of gears intermeshing with miter-gears 35, that are disposed on a horizontal shaft 36, mounted in bearings near the bottom of the frame. At one end of the shaft 36 is a sprocket-wheel 37, that is connected by a link belt 38 to a sprocket-wheel 39 on the shaft 23, so that the vertical spool-carrying shafts are driven continuously, it being noted, however, that the intermeshing gears 34 and 35 are so arranged that adjacent shafts rotate in opposite directions, respectively.

Each of the spool-carrying shafts is provided with a collar 40, carrying a pair of projecting pins 41, on which are mounted wire-carrying reels or spools 42, the latter being held from loose movement by leaf-spring clamps 43, that are carried by the ends of the pins 41 and bear against the end flanges of the spools. It will be noted that the pairs of spools are arranged so that adjacent bars are at different levels and are arranged with their axes at ninety degrees from the intervening bars, so that all of the spools may rotate without danger of the wire of one pair becoming crossed or entangled with the wires of another pair.

At the head of each of the spool-shafts 32 is a block 45, preferably rectangular in form and having grooves in two opposed faces for the passage of the wires from the pair of spools carried by said shaft. The wires are held under tension by plates 46, against which bear helical compression-springs 47, the stress of which may be adjusted by thumb-nuts 48, it being here observed that the tensional strain is exerted on the wire itself and not on the wire through the spool, thus avoiding the disadvantages which occur from the binding of the spool and the tightening of the coils of wire thereon.

The inner walls of the front side bars of the section 10 of the frame are provided with inwardly-extending brackets 50, each pair of brackets carrying a vertical rod 51, on which is guided a vertically-movable frame 52. These two frames 52 are connected to each other by a transversely-extending channel-bar 53, which carries the twisters, and vertical movement is imparted to said bar 53 for the purpose of elevating the twisters before the commencement of each twisting operation and then gradually lowering the twisters as the operation progresses, this being for the purpose of securing uniformity of twist. Between the upper set of angle-bars 30 and another pair of angle-bars 56, also carried by the main frame 10, extends a pair of brackets 57, carrying bearings for a shaft 58, which is operated in the manner hereinafter described. This shaft carries two arms 59, on which are mounted adjustable boxes 60, that are connected by links 61 to the vertically-slidable frames 52, the function of the shaft being to reciprocate the frame 52 and the twisters. Each twister comprises a vertically-disposed tube 63, which is mounted on the bar 53 by a U-shaped bracket 64, the space between the arms of the bracket serving for the reception of the hub portion of a sprocket-wheel 65, that is firmly secured to the twister-tube, as by a set-screw 66. At the top of the twister-tube is arranged a twister-block 67, that is rigidly secured within said tube and is provided with a plurality of pairs of peripheral notches 68, three pairs of notches being shown in the present instance. The two wires which form each longitudinal strand or cable pass through one pair of notches, and after the walls of the notches have become worn the twister-heads may be partly revolved in order to bring a second set of notches into position for the reception of the wires, and then the third set of notches may be used after the second set has become impaired. When worn out, the block may be readily replaced by a new one.

The several sprocket-wheels 65 are connected by a link belt 69, which runs to a driving-sprocket 70 at the upper end of a shaft 71, that is vertically disposed in bearings carried by the portion 11 of the frame. The lower end of the shaft 71 is provided with a beveled pinion 72, that intermeshes with a bevel-gear 73, the latter being carried by a shaft 74. The shaft 74 is provided with a pinion 75, that intermeshes with a mutilated gear 76, arranged at one side of and preferably formed integral with the gear 22. The pinion carries a lock 77, that engages with the untoothed portion 78 of the mutilated gear in order to prevent rotative movement of the pinion after the latter has moved from mesh with the teeth of said gear, so that the parts are preserved in proper relative position for reëngagement when the mutilated gear is moved to a sufficient extent. The pinion is rotated to the extent of a single revolution at each operation, and through the multiplying gears 73 and 72 the twisters may receive four or five or six revolutions, as desired.

The successive pickets are fed into the shed on top of a series of brackets 80 and are guided to a central position within said shed by plates or tongues 81, that are carried by vertically-disposed pins 82, projecting from the bracket at the entrance end. These pins 82 may be circumferentially adjusted and locked in place by set-screws 83 in order to accommodate pickets of different thickness.

After the pickets have been fed into the shed it is necessary to elevate them to the apex of the shed before the commencement of the twisting operation, and to effect this a number of vertically-disposed picket-raising bars 85 are employed. These bars are carried by a vertically-movable cross-bar 86. The bars or rods are threaded at the point where they extend through the cross-bar 86 and are provided with nuts 87 to permit adjustment in accordance with the width of the pickets employed. The lower ends of the bars or rods extend through guiding openings formed in brackets 88, that project from the upper set of channel-bars 30, and the upper ends of said bars or rods extend through guiding openings formed in brackets 90, that are carried by upper fixed cross-bars 91 of the frame.

The shaft 58, hereinbefore referred to, is provided with forwardly-extending arms 93, carrying boxes 94, which may be adjusted lengthwise of said arm, and these boxes 94 are connected by links 95 to the vertically-movable bar 86. The picket-raising bar and the twister-raising bar being both connected to the same shaft are operated simultaneously, so that at the completion of the picket-raising movement the twisters are in position to immediately commence the twisting operation.

Figure 1:
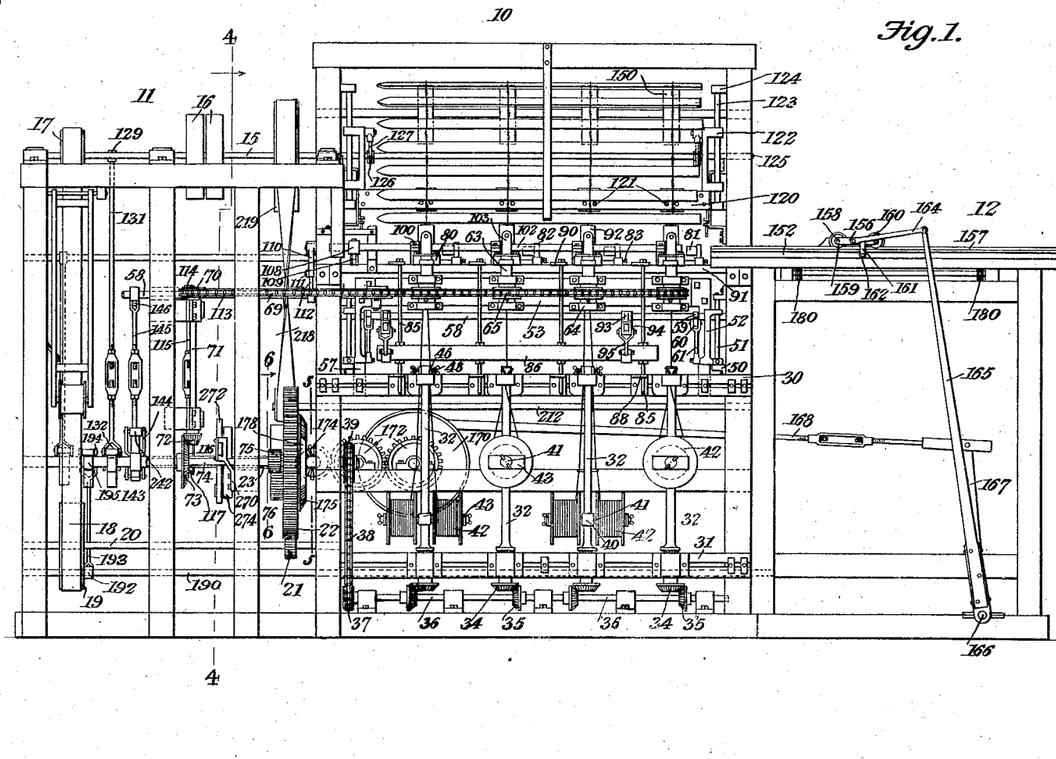
Figure 1 is a front elevation of a wire-fence loom constructed in accordance with the invention.
Figure 2:
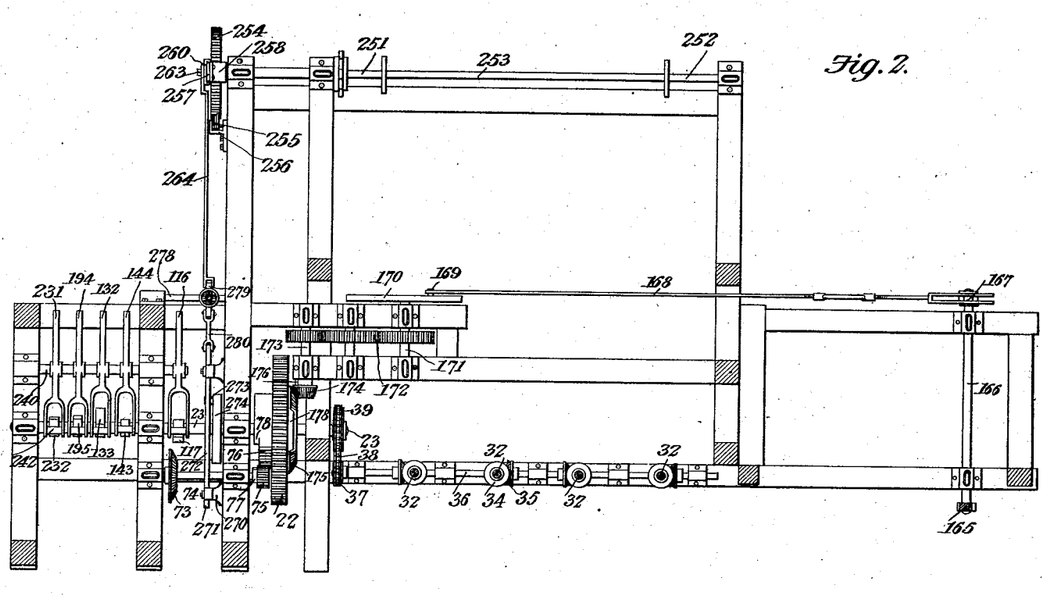
Fig. 2 is a plan view of the same, the view being partly in section and the upper portion of the mechanism being wholly omitted for the sake of clearness.
Figure 3:
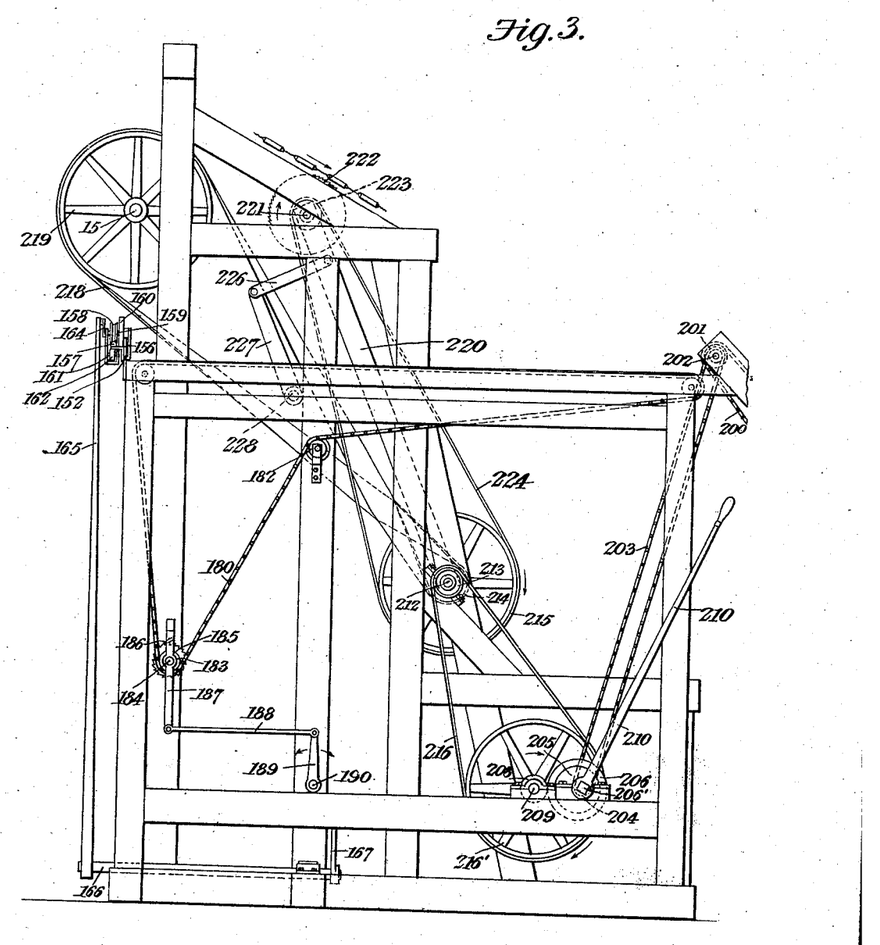
Fig. 3 is an end elevation of the machine looking from the right of Fig. 1.
Figure 4:
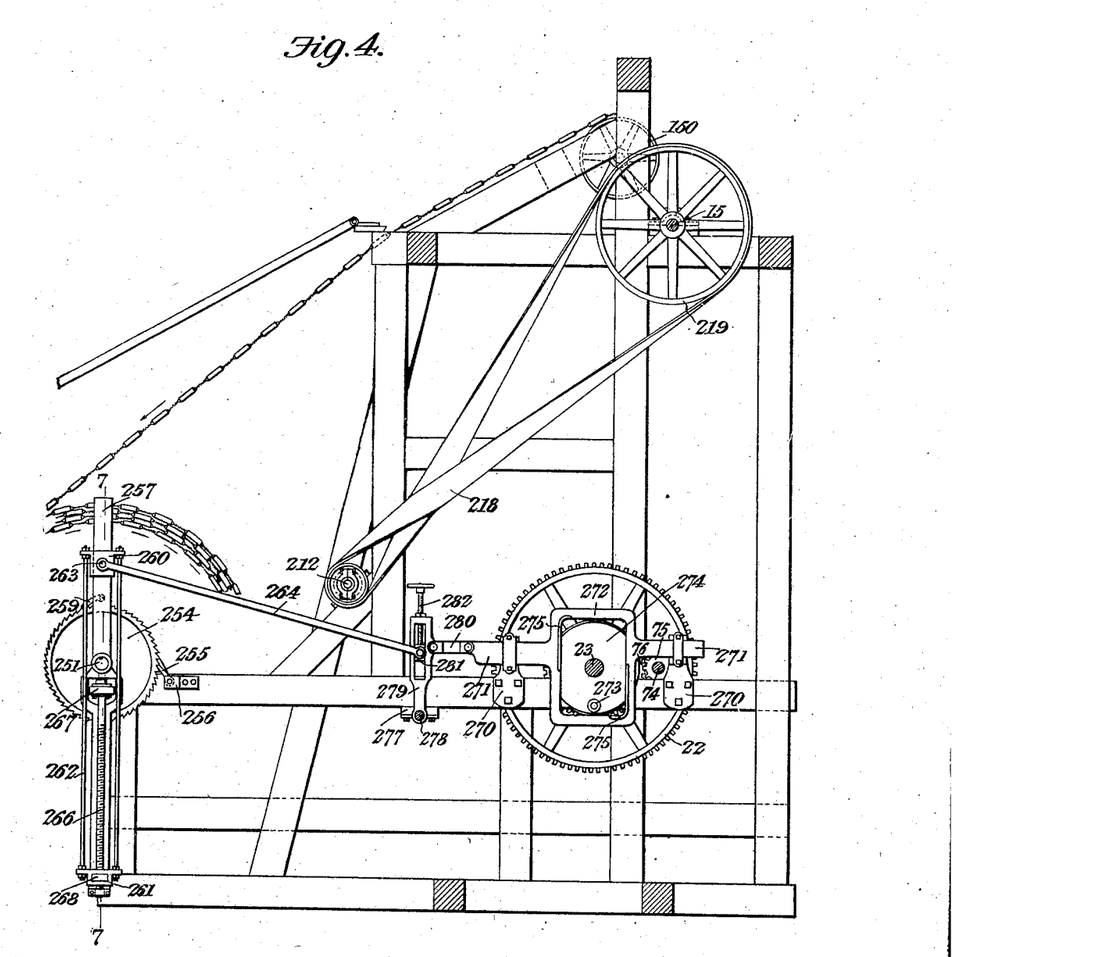
Fig. 4 is a sectional elevation of the machine on the line 4 4 of Fig. 1.
Figures 5, 6, 7:
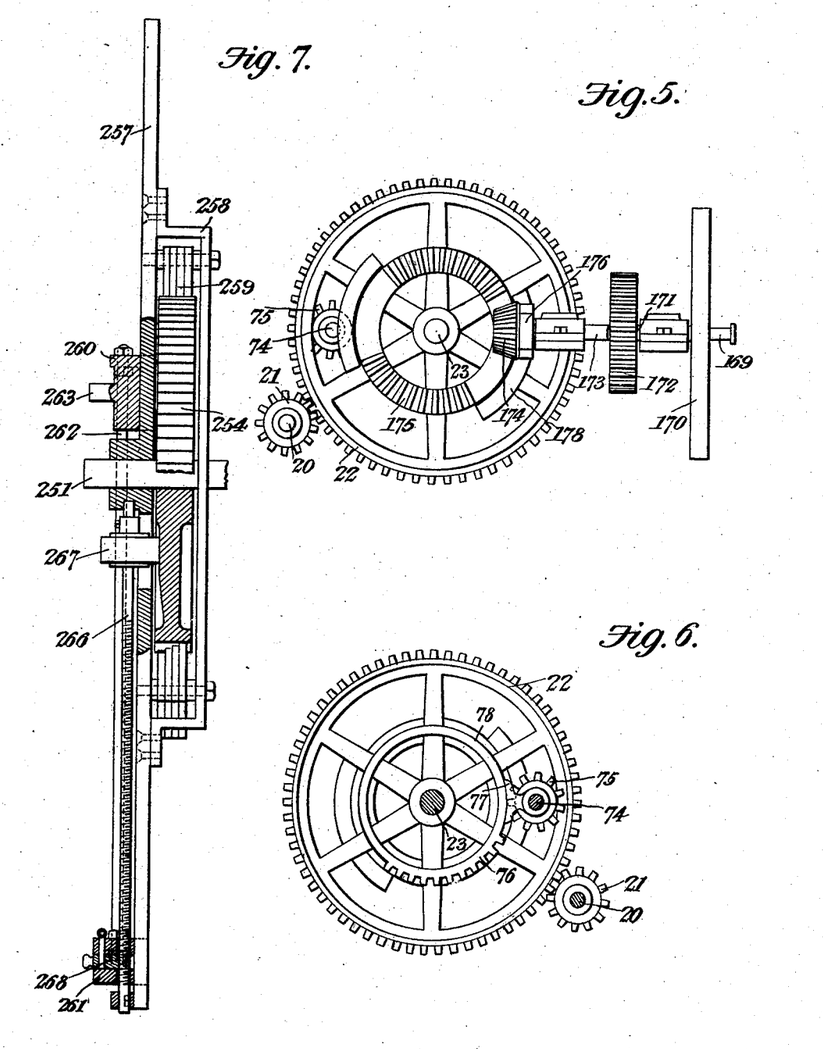
Fig. 5 is an elevation of the inner face of the main gear-wheel, showing a portion of the mechanism through which movement is transmitted to the main gear, the view being in section on the line 5 5 of Fig. 1.
Fig. 6 is a sectional view taken on the line 6 6 of Fig. 1 looking from the opposite side of the main gear-wheel.
Fig. 7 is a vertical section of the main take-up, the section being taken on the plane indicated by the line 7 7 of Fig. 4.
Figure 8:
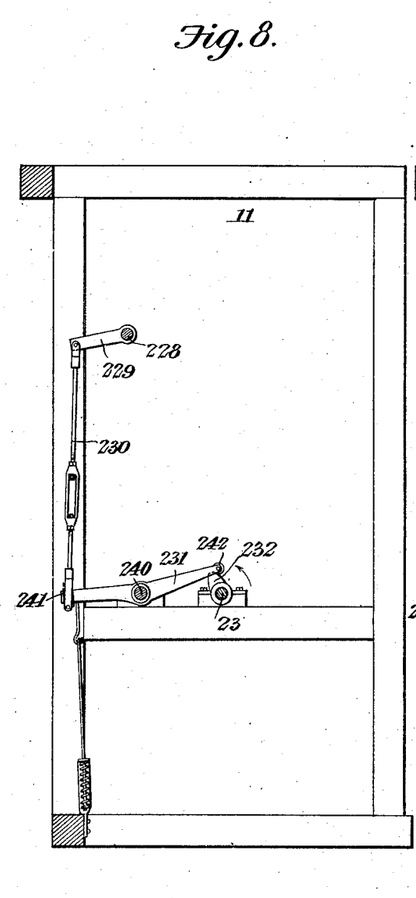
Figs. 8, 9, 10, and 11 are sectional views illustrating in elevation the controlling and timing cams for the various operations.
Figure 9:
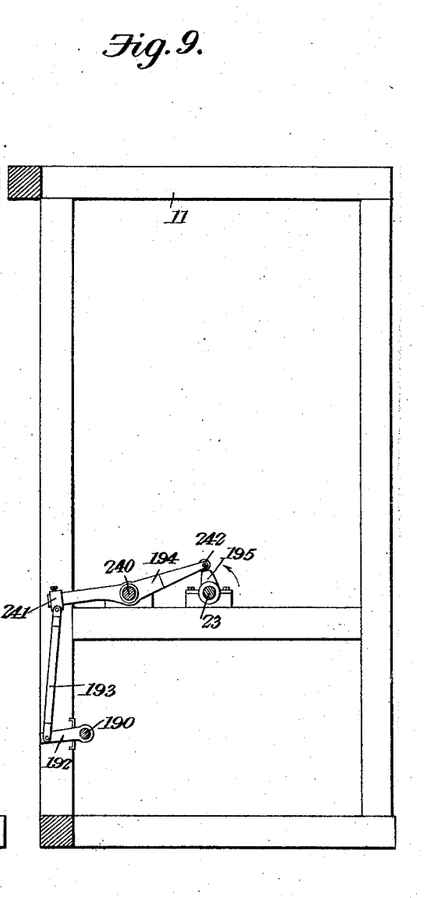
Figure 10:
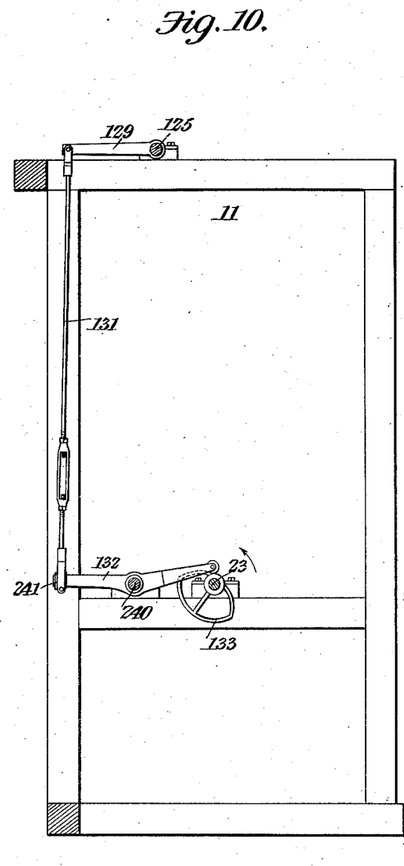
Figure 11:
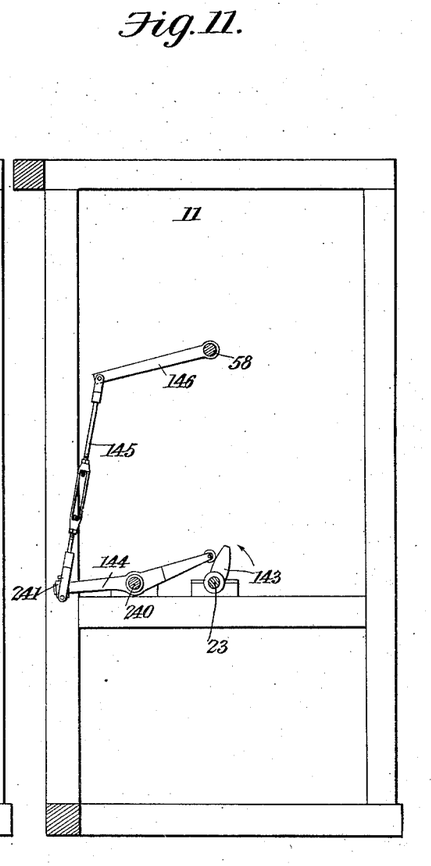
Figures 12, 15, 16, 17, 18:
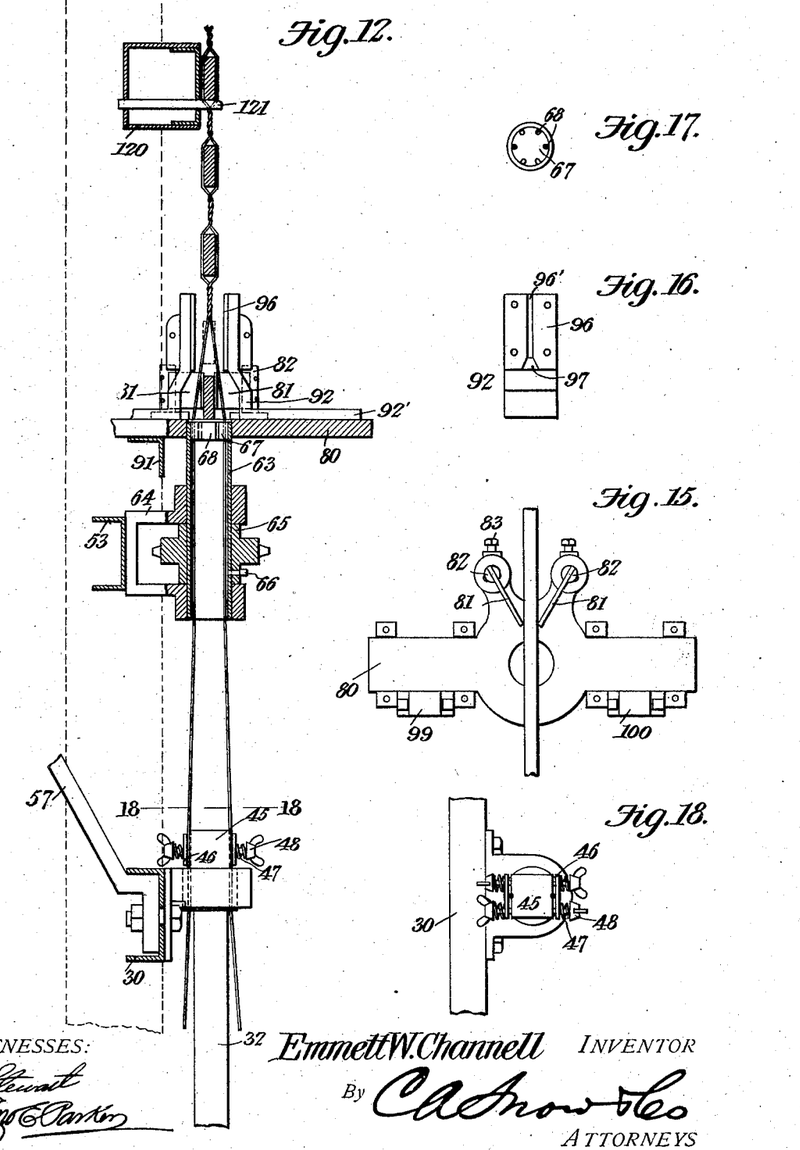
Fig. 12 is a sectional view, on an enlarged scale, of the upper portion of the mechanism, showing particularly the twisting and clamping devices in the positions assumed immediately after the picket has been fed into the shed.
Fig. 15 is a plan view of the clamp guiding and supporting bracket at the entrance end of the shed, showing the adjustable picket-guides.
Fig. 16 is a detail elevation of one of the clamping-bars, showing the wire-groove.
Fig. 17 is a detail plan view of one of the twisters.
Fig. 18 is a plan view of one of the spool-carrying shafts, taken on the line 18 18 of Fig. 12, showing the twisting devices for the wire.
Figure 14:
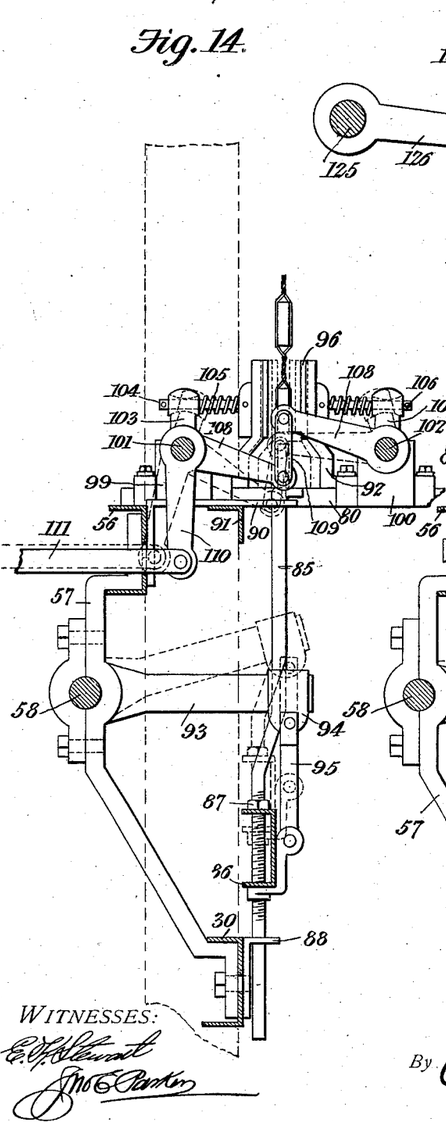
Fig. 14 is a sectional view taken at a point in advance of the twisters and clamps.
Figure 19:
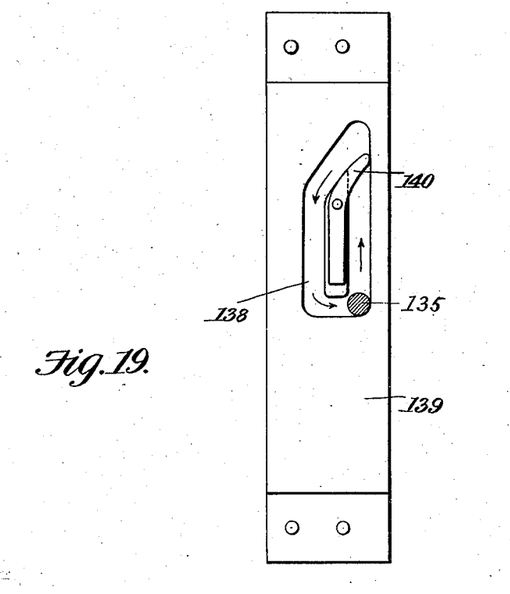
Fig. 19 is an elevation of the cam for controlling the movement of the take-up fingers.
Figure 20:
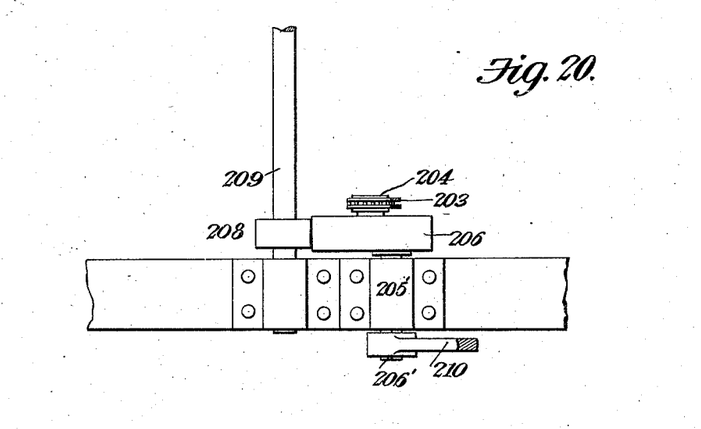
Fig. 20 is a plan view of the mechanism employed for transmitting movement to the picket-elevator.

The brackets 80 are provided with openings for the passage of the upper ends of the twister-head, and on each bracket is guided a pair of clamping-jaws 92. The clamps are provided with base members 92', that are held from vertical or lateral play by guide-straps 80', and their vertical faces are provided with detachable blocks 96, formed of hardened steel or other suitable material. These blocks are provided with grooves 96' to receive the wires, and the lower portion of each groove is enlarged, the walls being tapered, as indicated at 97, in order to permit the ready entrance of the wire and its rotative movement at the commencement of the twisting operation. Each of the brackets 80 is further provided with a pair of bearing-blocks 99 and 100, and said blocks are arranged for the reception of shafts 101 102, that extend for practically the full width of the main portion 10 of the frame. To each shaft a number of rocker-arms 103 are secured, there being a pair of rocker-arms in alinement with each pair of clamping-jaws. The upper ends of the rocker-arms are provided with enlarged openings to permit the free passage of pins 104, the inner ends of which are secured to the clamping-jaws, and between the rocker-arms and said jaws are arranged helical compression-springs 105, which tend normally to thrust the jaws toward each other, the movement being checked or limited by small pins or lugs 106, that extend through the spring-carrying pins at points outside the rocker-arms. When these rocker-arms are moved in one direction, they bear firmly against the springs and force the jaws toward each other under yielding pressure, so that the jaws may safely engage pickets of varying width and firmly hold the same without danger of breaking either the pickets or the jaws. In order to operate the jaws, the left-hand ends of the shafts are provided with inwardly-extending rocker-arms 108, that are connected to each other by a link 109, and the end of the shaft 101 carries a rocker-arm 110, that is connected by a link 111, Fig. 14, to a rocker-arm 112 on a shaft 113, that is mounted in suitable bearings in the portion 11 of the frame. To this shaft 113, Fig. 1, is secured a rocker-arm 114, that is connected by an adjustable link 115 to a lever 116, fulcrumed to the main frame. This lever 116 is operated upon by a cam 117 on the shaft 23, the contour of the cam being such as to operate the jaws at the proper time with relation to the movement of the feeding and wire-twisting mechanism. The construction of this portion of the mechanism is substantially the same as that shown in Figs. 8, 10, and 11, being merely for the purpose of connecting the rock-shaft 113 to the operating-cam on shaft 23, and detailed illustration of this particular feature is not considered essential to a full understanding of the invention.

After the twisting operation has been completed it becomes necessary to feed the completed fence upward one step, and for this purpose a vertically-movable frame 120 is employed, said frame being provided with a plurality of pairs of pins 121, which engage under a picket and move the whole fence upward and at the same time draw from the spools a sufficient quantity of wire to form the next shed. Each of the cables, formed of a pair of twisted wires, passes between a pair of pins, so that the strain will be uniform.

The opposite ends of the frame 120 are secured to carriages 122, that are slidably mounted on rods 123, the latter being secured to brackets 124, that are carried by the vertical bars of the main portion 10 of the frame. To impart vertical movement to these frames, a shaft 125 is mounted in bearings to the rear of the frame 120 and is provided with rocker-arms 126, that are connected by links 127 to the slidable frames 122. The shaft 125 extends across a portion of the frame 11 and is provided with a rocker-arm 129, that is connected by an adjustable link 131 to a lever 132, pivoted to the frame and under the control of a cam 133, that is mounted on the shaft 23, the cam being of such contour as to raise and lower the frame 120 at proper intervals.

Figure 13:
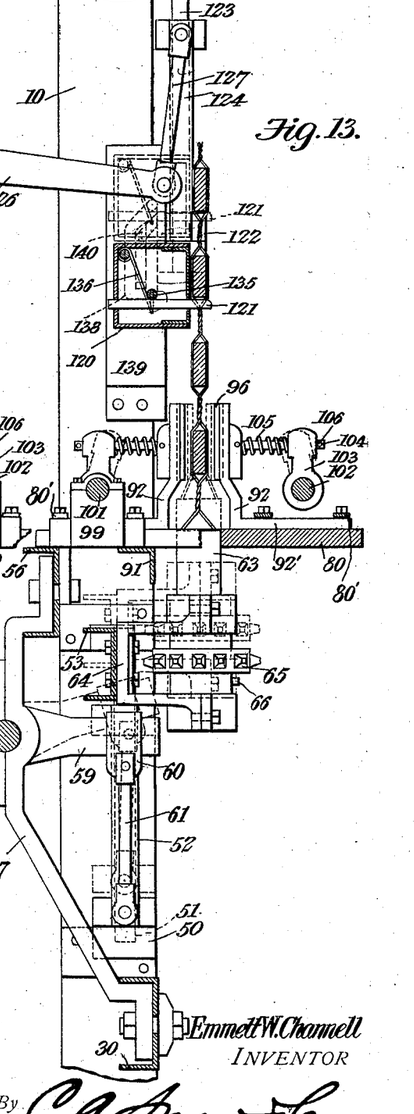
Fig. 13 is a similar view, somewhat more in detail, showing the position of the parts immediately after the completion of a twisting operation.

All of the pins 121 are connected to a bar 135, that extends horizontally within the frame 120 and is acted upon by a number of springs 136, that tend to force the bar forward and the pins 121 outward. The opposite ends of the bar 135 enter returning cams 138, that are formed in plates 139, secured to the inner vertical walls of the front bars of the frame 10, and, as will be noted on reference to Fig. 13, the bar will be arranged in the forward portion of the cam-groove at the starting of the upward movement and will continue therein and will hold the pins projected in picket-raising position until said bars pass the ends of switch-pins 140, that are so arranged at the top of each cam-groove as to guide the bar 135 to the rear against the stress of the springs 136, so that the lifter-pins 121 are withdrawn wholly within the frame 120 and are retained therein until the frame is lowered to a position where the pins may project under the next picket.

The shaft 58, which actuates the twister-heads and picket-lifters, is operated from a cam 143, also carried by the shaft 23. This cam operates on a lever 144, pivoted to the main frame, and said lever is connected by an adjustable link 145 to a rocker-arm 146 on one end of the shaft 58.

In the operation of the mechanism as thus far described a picket is fed into the open shed on top of the brackets 80, being guided to a central position by the plates 81, and the picket rests on these brackets until engaged by the lifter-rods 85. As soon as movement is imparted to the shaft 58 from cam 143 both the lifter-rods 85 and the twisters start to move upward, and a picket is forced up to the apex of the shed, while the twister follows in readiness to commence the twisting operation. The cam 117 then operates through the mechanism previously described and rocks the shafts 101 and 102, forcing the jaws inward against the picket, the wires being received within the grooves 96′, formed in the wear-plates 96 on the clamps. The twisters then start to operate, and the twisting operation progresses as the picket-lifters and twister-heads are lowered, until at the completion of the operation the parts are locked. The cam 133 then operates on the shaft 125, and the pins 121, previously projected beneath a picket, will elevate the completed fabric, forming another shed in readiness for the insertion of another picket.

The completed fabric passes upward over a revoluble guide 150 and passes to the rear of the machine, where it is collected in the form of a roll by an automatic take-up mechanism.

The single pickets to be fed to the sheds are supplied in consecutive order to a rail 152 and are there engaged and forced within the shed by a feeding-carriage 156.

The carriage-rail is in the form of an angle-bar, and on the upper and horizontal web thereof is a track 157 for the reception of a pair of grooved wheels 158, mounted on spindles 159 on the carriage-frame. The spindles 159 also carry smooth rollers 160, which run directly on top of the horizontal web of the angle-bar. The carriage-frame is provided with a hanger 161, carrying a small wheel 162, which runs against the lower face of the horizontal web of the angle-bar in order to prevent displacement of the carriage. Extending from one side of the frame is a pivoted arm or link 164, that is connected to the upper end of a rocker-arm 165, said arm being secured to a rock-shaft 166, that is mounted in suitable bearings in the portion 12 of the frame. The rock-shaft also carries a rocker-arm 167, that is connected by an adjustable rod 168 to a wrist-pin 169, that projects from the rear face of a crank-disk 170, that is carried by a shaft 171, adapted to suitable bearings in the frame. The shaft 171 is connected by a train of gearing 172 to a shaft 173, which carries at its outer end a bevel-pinion 174, that is arranged to intermesh with a mutilated bevel-gear 175, that is carried by or forms a part of the main gear-wheel 22. The mutilated bevel-gear 175 has two active faces, separated by two blank spaces, and the toothed or active faces are so proportioned with relation to the remaining gears that the operation of each will effect a half-revolution of the crank-disk and the rocker-arm 165 will thereupon be carried the full limit of its stroke in one direction or the other. The bevel-pinion carries a cam-lock 176, that is arranged to engage with locking devices 178, carried by the gear, for the purpose of locking the picket-feeding mechanism from movement between intervals of operation of the gears.

The wrist-pin is so arranged that its stopping-points are in the horizontal plane of the axis of the crank-disk, so that at the commencement of the feeding movement where the feed-carriage engages the end of the picket the operation will be comparatively slow, and the carriage may engage the picket without danger of jar or displacement. From then on the speed of the feed increases as the wrist-pin approaches the vertical, and after that gradually decreases toward the completion of the feeding movement, at which time the movement is so gradual that there is no danger of feeding the picket farther than necessary.

The pickets are moved to feeding position by a pair of endless feed-chains 180, having horizontal runs at the top of the portion 12 of the frame, the lower runs of the chains being guided by sprocket-wheels 182 and 183. It is only necessary for one of the chains to pass around the sprocket-wheel 183, although the carrying-shaft 184 of the latter may be extended and provided with two sprocket-wheels for the purpose. On this shaft 184 is arranged a ratchet-wheel 185, the teeth of which are arranged to be engaged by a pawl 186, carried by a bar 187, that is pivoted on the shaft. The lower end of the bar 187 is connected by a link 188 to a rocker-arm 189 on a horizontally-disposed shaft 190. This shaft extends across the frame 10 and partly across the frame 11 and is provided with a rocker-arm 192, that is connected by a link 193 to a lever 194, pivoted on the frame and under the control of a cam 195, mounted on the shaft 23.

The cam 195 is so actuated as to effect rocking movement of the shaft 190, and this movement is transmitted through the pawl-and-ratchet mechanism to the feed-chains, so that the pickets may be fed in the direction of the carriage-supporting bar 152.

In order to supply the feed-chains 180, an elevator 200 is employed, said elevator being in the form of inclined chains which serve to raise the pickets to a point above the chains 180. The chains 200 are mounted on sprocket-wheels, the upper ones being shown at 201 and being carried by a shaft 202, which also carries a sprocket-wheel for the reception of a link belt 203. The lower end of the link belt 203 passes around a sprocket-wheel 204, that is carried by a sleeve 206, which encircles a disk 205. This disk is arranged at one end of a short shaft 206', mounted in a suitable bearing 205' in the frame and provided at one end with an operating-lever 210. The shaft 206' may be turned by means of the operating-lever until the periphery of the sleeve 206 is moved into engagement with a friction-pulley 208 on a suitable shaft 209, held in bearings in the lower portion of the frame.

At a point above the shaft 209 is arranged a shaft 212, that supports three pulleys 213, 214, and 215, the pulley 213 being connected by a belt 216 to a belt-wheel 216' on the shaft 209. The pulley 214 is connected by a belt 218 to a belt-wheel 219 on the main or primary shaft 15 of the machine.

The shaft 212 forms a pivotal support for a swinging frame 220, that carries at its upper end an arbor 221, on which is mounted a circular saw 222. The shaft 221 also carries a pulley 223, that is connected to the belt-wheel 215 by a belt 224, so that the saw is constantly driven. The frame 220 is connected by a link 226 to a rocker-arm 227, carried by a rock-shaft 228, that extends across to the frame 11 and is there provided with a rocker-arm 229, that is connected by an adjustable link 230 to a lever 231, pivoted to the frame and under the control of a cam 232 on the shaft 23. The cam 232 actuates the saw-frame in such manner as to move the saw across the line of each successive picket, so that the end of the pickets will be trimmed and made of uniform length. While the saw is constantly running, it is only moved into engagement with the pickets at intervals, and there is very little wear or friction on the saw.

In mounting the several levers 116, 132, 144, 194, and 231 a stationary shaft 240 is employed, and on each lever is an adjustable box 241, which forms the connection between the lever and its adjustable link. By varying the positions of the several boxes 241 with respect to the center of movement of the levers the throw may be altered to any desired extent. The opposite ends of the levers are bifurcated, and each carries an antifriction-roller 242 for engagement by its operating-cam.

At the rear of the machine are alined shafts 251 and 252 for the reception of a winding shaft or roller 253, on which the finished fence may be wound, the shaft or roller 253 being detachable, so that it may be readily removed to form the core of a complete roll. At the outer end of the shaft 251 is secured a ratchet-wheel 254, that is engaged by a pawl or pawls 255, carried by a bracket 256, projecting from the frame for the purpose of preventing reverse movement of the ratchet-wheel. Pivoted loosely on the shaft 251 is a lever 257, that is arranged outside the ratchet-wheel and carries a strap 258, that encircles the ratchet-wheel, and between the strap and the lever are pivoted pawls 259, which engage with and impart the take-up movement to the ratchet-wheel, the take-up being automatically adjustable during the operation of the machine in order to compensate for the gradual increase in the diameter of the roll of fencing.

Mounted on the lever 257 are two slide-blocks 260 261, that are rigidly secured together by bolts 262. The upper of these blocks carries a wrist-pin 263, that is connected by a rod or link 264 to an operating mechanism which receives uniform movement and transmits uniform movement, provision being made for gradually increasing the distance between the wrist-pin and the axis of the shaft 251 in order to gradually lessen the movement imparted to the ratchet-wheel in proportion to the increase in diameter of the roll of fencing.

The lever 257 is provided with upper and lower bearings for the reception of a shaft 266, that is arranged parallel with the lever and is threaded for the greater portion of its length. At the upper end of this shaft is secured a friction or gear wheel 267, that constantly engages with the face of the ratchet-wheel 254 and receives motion therefrom. The lower block 261 carries a half-nut 268, which may be readily moved to and from engagement with the threaded portion of the shaft 266. When in engagement with this shaft, the turning of the latter at each partial movement of the ratchet-wheel will gradually raise the structure formed by the blocks 260 261 and rods 262, so that the wrist-pin 263 will be gradually moved away from the axis of shaft 251, and this will of course result in gradual decrease in the extent of movement imparted through the pawls 259 to the ratchet-wheel.

At a suitable point on each side of the shaft 23 are arranged brackets 270, that form guides for the arms 271 of a yoke 272, that surrounds the shaft 23 and is arranged to be engaged by an antifriction-roller 273, carried by a pin that projects from a crank-disk 274 on the shaft 23, the yoke having wear-plates 275, arranged at diagonally opposite points of the yoke and adapted to be successively engaged by the antifriction-roller 273.

Projecting from a bracket 277 on the frame is a pin 278, on which is pivoted a lever 279, that is connected by a link 280 to one of the arms 271. The arm 279 is provided with an elongated slot in which is mounted a slidable block 281, that is swiveled to the lower end of a screw 282, the screw being readily turned in order to raise or lower said block. This block is connected to the inner end of the rod or link 264, through which motion is imparted to the take-up, and by altering the position of the block the extent of movement imparted to the wrist-pin 263 may be increased or diminished.

I claim—

1. In a wire-fence machine, a picket-feeding means, means for moving the pickets into the apex of the shed, a twister arranged to hold the wires spread to form such shed, means for clamping the successive pickets and the wires, and means for moving the twisters away from the pickets during the twisting operation.

2. In a wire-fence machine, means for feeding pickets, means for moving the pickets into the apex of the shed, twisters, means for operating the twisters, means for clamping the wires on the successively-fed pickets, and means for effecting gradual spacing of the twisters and the picket during the progress of the twisting operation.

3. In a wire-fence machine, a shed-forming means including twisters, means for feeding pickets into the shed, means for moving the pickets into the apex of the shed, means for clamping the wires on the successively-fed pickets, means for revolving the twisters, and means for gradually separating the pickets and the twisters as the twisting operation progresses.

4. In a wire-fence machine, a shed-forming means including twisters, means for feeding pickets into the shed, means for moving the pickets into the apex of the shed, means for clamping such pickets, means for raising the twisters close to the clamped picket, and means for revolving the twisters.

5. In a wire-fence machine, the combination with a picket-feeding means, of a pair of clamps, clamp-operating means including springs through which yielding pressure is exerted on the clamps, and detachable wear-blocks carried by such clamps and having grooved picket-engaging faces for the reception of the wires.

6. In a wire-fence machine, the combination with a picket-feeding means, of picket-clamps, and wear-blocks carried by the clamps, said blocks having wire-receiving grooves, and the end portions of such grooves being tapered to permit initial twisting of the wire.

7. In a wire-fence machine, a picket-lifter mechanism comprising a movable bar or frame, a plurality of picket-engaging pins, a bar carrying such pins, and a return-cam for moving said bar and engaging and disengaging the pins and pickets.

8. In a wire-fence machine, a picket-lifter mechanism comprising a frame, a plurality of pins supported by the frame, a bar secured to all of said pins, a pair of cams in which the opposite ends of said bars are entered, a spring tending normally to throw the pins outward into picket-engaging position, and switch members at the upper portions of the cams for permitting the withdrawal of said pins from engagement with the pickets.

9. In a wire-fence machine, a main gear-wheel, arranged to revolve once for the introduction of each picket and each twisting operation, mutilated gears carried by said main wheel, a picket-feeding device receiving motion from one of said mutilated gears, and a twister-actuating device arranged to receive motion from the second mutilated gear.

10. In a wire-fence machine, the combination with the picket-feeding devices, of twisters, means for revolving the twisters, means for moving the pickets into the shed, a take-up means for feeding the finished fence, a saw for trimming the pickets, a cam-shaft, a plurality of cams mounted on said shafts, and levers arranged to be operated upon by the cams, said levers being connected to the twisting, picket-lifting, picket-feeding, and sawing mechanisms, and serving to operate the same in proper order.

In testimony that I claim the foregoing as my own I have hereto affixed my signature in the presence of two witnesses.

EMMETT WICKLIFF CHANNELL.

Witnesses:
J. W. WETHERILL,
M. C. SIMMONS.